(12) United States Patent
Ikeda et al.

(10) Patent No.: US 9,534,558 B2
(45) Date of Patent: Jan. 3, 2017

(54) CONTROL DEVICE FOR INTERNAL COMBUSTION ENGINE

(75) Inventors: Yuji Ikeda, Kobe (JP); Shigeo Nomura, Kariya (JP); Yoshiaki Nishijima, Kariya (JP)

(73) Assignee: IMAGINEERING, INC., Kobe-shi (JP)

( * ) Notice: Subject to any disclaimer, the term of this patent is extended or adjusted under 35 U.S.C. 154(b) by 674 days.

(21) Appl. No.: 13/982,452

(22) PCT Filed: Jan. 10, 2012

(86) PCT No.: PCT/JP2012/050257
§ 371 (c)(1),
(2), (4) Date: Oct. 3, 2013

(87) PCT Pub. No.: WO2012/102070
PCT Pub. Date: Aug. 2, 2012

(65) Prior Publication Data
US 2014/0019029 A1  Jan. 16, 2014

(30) Foreign Application Priority Data

Jan. 28, 2011 (JP) ................................ 2011-016136

(51) Int. Cl.
*F02D 43/04* (2006.01)
*F02D 41/40* (2006.01)
(Continued)

(52) U.S. Cl.
CPC ............. *F02D 43/04* (2013.01); *F02D 35/023* (2013.01); *F02D 35/028* (2013.01);
(Continued)

(58) Field of Classification Search
CPC ...... F02D 43/04; F02D 35/023; F02D 35/028; F02P 23/045; F02P 3/01; F02P 41/0403; F02P 9/007; F02B 2023/085; F02B 23/101; Y02T 10/44
See application file for complete search history.

(56) References Cited

U.S. PATENT DOCUMENTS 5,027,764 A * 7/1991 Reimann ................. F02P 23/04
    123/143 B
6,581,581 B1 * 6/2003 Bebich ................. F02P 23/045
    123/536
(Continued)

FOREIGN PATENT DOCUMENTS

EP    1302650 A2    4/2003
JP    56-156411 A   12/1981
(Continued)

OTHER PUBLICATIONS

International Search Report of PCT/JP2012/050257, mailing date of May 15, 2012.

*Primary Examiner* — Hieu T Vo
*Assistant Examiner* — Sherman Manley
(74) *Attorney, Agent, or Firm* — Westerman, Hattori, Daniels & Adrian, LLP

(57) ABSTRACT

In a compression ignition internal combustion engine 20 that generates electromagnetic wave plasma by emitting electromagnetic waves to a combustion chamber 21 during a period of a preceding injection, a control device 10 for internal combustion engine controls a fuel injection device 24 to perform, before a main injection, a preceding injection less in injection quantity than the main injection, while controlling a plasma generation device 30 to generate electromagnetic plasma by emitting electromagnetic waves to the combustion chamber 21 during the period of the preceding injection. The control device 10 controls a condition of heat production due to combustion of fuel from the main injection by controlling the amount of energy of the electromagnetic waves emitted to the combustion chamber 21 during (Continued)

the period of the preceding injection according to the operating condition of the internal combustion engine main body 22.

11 Claims, 5 Drawing Sheets

(51) Int. Cl.
*F02P 3/01* (2006.01)
*F02P 23/04* (2006.01)
*F02D 35/02* (2006.01)
*F02D 41/30* (2006.01)
*F02P 5/153* (2006.01)
*F02P 9/00* (2006.01)
*F02B 23/10* (2006.01)
*F02B 23/08* (2006.01)

(52) U.S. Cl.
CPC ....... *F02D 41/3041* (2013.01); *F02D 41/403* (2013.01); *F02P 3/01* (2013.01); *F02P 5/153* (2013.01); *F02P 23/045* (2013.01); *F02B 23/101* (2013.01); *F02B 2023/085* (2013.01); *F02D 2200/101* (2013.01); *F02D 2200/1002* (2013.01); *F02P 9/007* (2013.01); *Y02T 10/44* (2013.01)

(56) References Cited

U.S. PATENT DOCUMENTS

| | | | | |
|---|---|---|---|---|
| 7,387,115 | B1* | 6/2008 | Katoh | F02P 9/007 123/143 B |
| 7,838,854 | B2* | 11/2010 | Algots | H05G 2/003 250/504 R |
| 8,082,897 | B2* | 12/2011 | Kato | F02P 9/007 123/143 R |
| 8,847,494 | B2* | 9/2014 | Kameda | F02P 9/007 315/111.21 |
| 2003/0070650 | A1 | 4/2003 | Ishikawa et al. | |
| 2007/0114901 | A1* | 5/2007 | Nagasawa | F02P 9/007 313/141 |
| 2007/0221156 | A1* | 9/2007 | Hagiwara | F02P 9/007 123/143 B |
| 2007/0221157 | A1* | 9/2007 | Hagiwara | F02P 9/007 123/143 B |
| 2009/0007893 | A1* | 1/2009 | Kato | F02P 23/04 123/596 |
| 2009/0229581 | A1 | 9/2009 | Ikeda | |
| 2009/0266325 | A1* | 10/2009 | Kumar | H01T 13/50 123/143 B |
| 2010/0132666 | A1* | 6/2010 | Sato | H01T 13/50 123/406.19 |
| 2010/0192909 | A1* | 8/2010 | Ikeda | F02D 41/402 123/436 |
| 2011/0297131 | A1* | 12/2011 | Nakano | F02P 9/007 123/596 |

FOREIGN PATENT DOCUMENTS

| | | |
|---|---|---|
| JP | 2003-120391 A | 4/2003 |
| JP | 2003-343332 A | 12/2003 |
| JP | 2007-113570 A | 5/2007 |
| JP | 2009-287549 A | 12/2009 |
| JP | 2010-255484 A | 11/2010 |
| WO | 2008/035448 A1 | 3/2008 |
| WO | 2009/008521 A1 | 1/2009 |
| WO | 2012/102070 A1 | 8/2012 |

\* cited by examiner

CONTROL DEVICE FOR INTERNAL COMBUSTION ENGINE

TECHNICAL FIELD

The present invention relates to a control device for an internal combustion engine that executes compression ignition of fuel in a combustion chamber.

BACKGROUND ART

Conventionally, there is known an internal combustion engine that executes compression ignition of fuel in a combustion chamber. For example, Japanese Unexamined Patent Application, Publication No. 2009-287549 discloses an internal combustion engine of this kind that emits electromagnetic waves to a combustion chamber to generate electromagnetic wave plasma.

More particularly, in the internal combustion engine disclosed in Japanese Unexamined Patent Application, Publication No. 2009-287549, when a piston is placed in the vicinity of the top dead center, an injector injects fuel, and the injected fuel is ignited. In the combustion chamber, a flame is formed centered on the injector. Then, a microwave pulse is supplied in a region in the vicinity of the flame, electrons in the flame are energized and accelerated while receiving the energy therefrom, and the accelerated electrons collide with ambient molecules. The collision molecules are ionized to form plasma. Also, free electrons in the plasma are energized and accelerated, and ambient molecules collide with the electrons and become plasma. In this internal combustion engine, an avalanche-like generation of plasma occurs, and comparatively large plasma is generated.

Furthermore, as a fuel injection device that injects fuel in a compression ignition internal combustion engine, for example, Japanese Unexamined Patent Application, Publication No. 2010-255484 discloses a fuel injection device that executes a multiple injection. The fuel injection device executes a plurality of fuel injections including at least a pilot injection and a main injection during one combustion cycle.

THE DISCLOSURE OF THE INVENTION

Problems to be Solved by the Invention

In a compression ignition internal combustion engine, for a purpose of reducing noise due to combustion of fuel from the main injection (hereinafter, simply referred to as "main combustion"), a preceding injection is executed prior to the main injection. Since the preceding injection raises temperature in the combustion chamber before the main injection and advances ignition timing of a part of the fuel, a period of the main combustion is prolonged. As a result of this, a steep rise of in-cylinder pressure due to ignition delay is suppressed. In this manner, the preceding injection makes it possible to optimize the condition of the main combustion and suppress noise. However, since a main body of the internal combustion engine changes in operating condition, it is difficult to stably optimize the condition of the main combustion by merely executing the preceding injection alone.

The present invention has been made in view of above described circumstances, and it is an object of the present invention to stably optimize the condition of the main combustion in response to changes in operating condition of a main body of a compression ignition internal combustion engine that generates electromagnetic wave plasma by emitting electromagnetic waves to a combustion chamber during a period of the preceding injection.

Means for Solving the Problems

In accordance with a first aspect of the present invention, there is provided a control device for an internal combustion engine, the internal combustion engine including: an internal combustion engine main body that executes compression ignition of fuel in the combustion chamber; a fuel injection unit that is attached to the internal combustion engine main body and injects fuel to the combustion chamber; and a plasma generation unit that is attached to the internal combustion engine main body and generates electromagnetic wave plasma by emitting electromagnetic waves to the combustion chamber. The control device is provided with a control unit that controls the fuel injection unit to execute, before a main injection, a preceding injection that is less in injection quantity than the main injection, while controlling the plasma generation unit to generate electromagnetic wave plasma by emitting electromagnetic waves to the combustion chamber during a period of the preceding injection. The control unit controls a condition of heat production due to the main combustion by controlling the amount of energy of the electromagnetic wave emitted to the combustion chamber during the period of the preceding injection according to an operating condition of the internal combustion engine main body.

According to the first aspect of the present invention, by generating the electromagnetic wave plasma during the period of the preceding injection, a period of the main combustion is prolonged in comparison with a case in which electromagnetic wave plasma is not generated, and the condition of the main combustion is optimized, as described above. Prolongation of the period of the main combustion leads to change in condition of the heat production due to the main combustion. Therefore, by generating the electromagnetic wave plasma during the period of the preceding injection, the condition of the heat production due to the main combustion changes. It is possible to change the condition of the heat production due to the main combustion by changing the amount of energy of the electromagnetic wave emitted to the combustion chamber during the period of the preceding injection. According to the first aspect of the present invention, the amount of the energy of the electromagnetic wave emitted to the combustion chamber during the period of the preceding injection is controlled according to the operating condition of the internal combustion engine main body.

In accordance with a second aspect of the present invention, in addition to the first aspect of the present invention, the control unit controls a rise timing of the heat production due to the main combustion by controlling the amount of the energy of the electromagnetic wave emitted to the combustion chamber during the period of the preceding injection according to injection quantity of the preceding injection.

According to the second aspect of the present invention, by controlling the amount of the energy of the electromagnetic wave emitted to the combustion chamber during the period of the preceding injection according to injection quantity of the preceding injection, the rise timing of the heat production due to the main combustion is controlled. For example, as the injection quantity of the preceding injection increases, the energy of the electromagnetic wave emitted to the combustion chamber during the period of the preceding injection is increased. According to the second aspect of the present invention, since fuel from the preceding injection is stably combusted, the rise timing of the heat production due to the main combustion is stably controlled.

In accordance with a third aspect of the present invention, in addition to the second aspect of the present invention, the control unit controls the rise timing of the heat production due to the main combustion by controlling a timing of the preceding injection in relation to the main injection.

According to the third aspect of the present invention, not only the energy of the electromagnetic wave but also the timing of the preceding injection in relation to the main injection is controlled so as to control the rise timing of the heat production due to the main combustion. When the timing of the preceding injection changes in relation to the main injection, fuel concentration distribution changes in the combustion chamber before the main injection, and therefore it is possible to change the rise timing of the heat production due to the main combustion.

In accordance with a fourth aspect of the present invention, in addition to the first aspect of the present invention, the control unit controls a length of a period from rise to fall of the heat production due to the main combustion by controlling the amount of the energy of the electromagnetic wave emitted to the combustion chamber during the period of the preceding injection according to the injection quantity of the preceding injection.

According to the fourth aspect of the present invention, the length of the period from rise to fall of the heat production due to the main combustion is controlled by controlling the amount of the energy of the electromagnetic wave emitted to the combustion chamber during the period of the preceding injection according to the injection quantity of the preceding injection. For example, as the injection quantity of the preceding injection increases, the energy of the electromagnetic wave emitted to the combustion chamber during the period of the preceding injection is increased. According to the fourth aspect of the present invention, since the fuel injected by the preceding injection is stably combusted, the length of the period from rise to fall of the heat production due to the main combustion is stably controlled.

In accordance with a fifth aspect of the present invention, in addition to the first or the fourth aspect of the present invention, the control unit, while generating electromagnetic wave plasma by emitting electromagnetic waves to the combustion chamber during a period of the main injection, controls the length of the period from rise to fall of the heat production due to the main combustion by controlling the amount of the energy of the electromagnetic wave emitted to the combustion chamber during the period of the main injection.

According to the fifth aspect of the present invention, by controlling amount of the energy of the electromagnetic wave emitted to the combustion chamber during the period of the main injection, the length of the period from rise to fall of the heat production due to the main combustion is controlled.

In accordance with a sixth aspect of the present invention, in addition to any one of the first to fifth aspects of the present invention, the control unit controls a timing for the plasma generation unit to generate the electromagnetic wave plasma during the period of the preceding injection according to the operating condition of the internal combustion engine main body.

According to the sixth aspect of the present invention, the timing of generation of the electromagnetic wave plasma during the period of the preceding injection is controlled according to the operating condition of the internal combustion engine main body.

Effect of the Invention

According to the present invention, the amount of the energy of the electromagnetic wave emitted to the combustion chamber during the period of the preceding injection is controlled based on a value corresponding to the operating condition of the internal combustion engine main body. The optimum condition of the main combustion differs depending on the operating condition (such as load and rotation rate) of the internal combustion engine main body. According to the present invention, the amount of the energy of the electromagnetic wave emitted to the combustion chamber during the period of the preceding injection is determined based on the operating condition of the internal combustion engine main body. Therefore, it is possible to stably optimize the condition of the main combustion in response to a change in operating condition of the internal combustion engine main body.

BEST MODE FOR CARRYING OUT THE INVENTION

Figure 1:
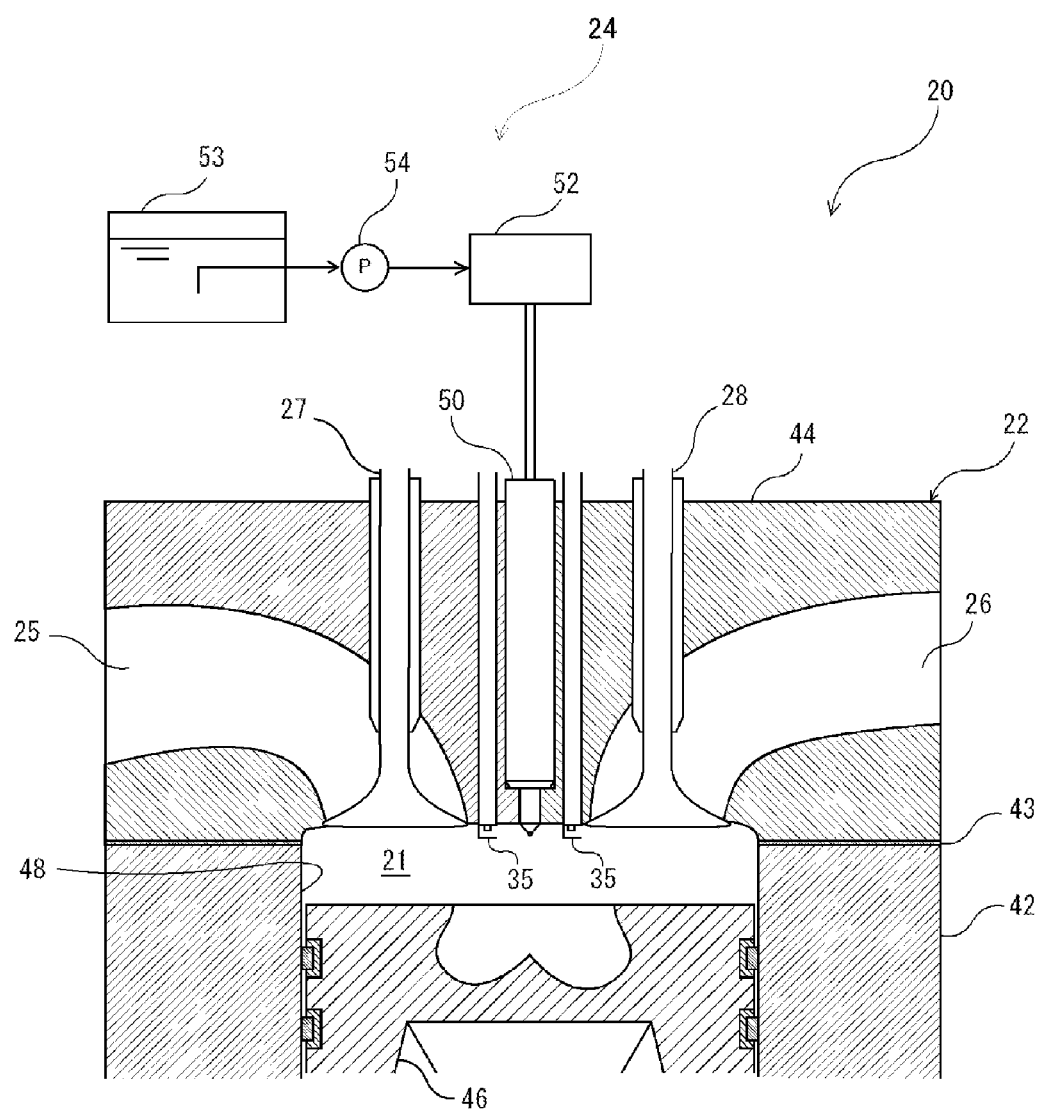
FIG. 1 is a cross-section view of an internal combustion engine according to an embodiment.

In the following, a detailed description will be given of the embodiment of the present invention with reference to drawings. It should be noted that the following embodiment is a mere example that is essentially preferable, and is not intended to limit the scope of the present invention, applied field thereof, or application thereof.

The present embodiment is directed to a compression ignition internal combustion engine 20 that executes compression ignition of fuel in a combustion chamber 21. The internal combustion engine 20 promotes combustion using microwave plasma. The internal combustion engine 20 is controlled by a control device 10 for an internal combustion engine according to the present invention (hereinafter, simply referred to as a "control device"). It is to be noted that the control device 10 is merely one example of the present invention. The internal combustion engine 20 is provided with an internal combustion engine main body 22, a fuel injection device 24, and a plasma generation device 30.

<Internal Combustion Engine Main Body>

As shown in FIG. 1, the internal combustion engine main body 22 is provided with a cylinder block 42, a cylinder head 44, and pistons 46. The cylinder block 42 is formed with a plurality of cylinders 48 each having circular cross sections. Inside of each cylinder 48, the piston 46 is slidably mounted. The piston 46 is connected to a crankshaft (not shown) via a connecting rod (not shown). The crankshaft is rotatably supported by the cylinder block 42. While the piston 46 reciprocates in each cylinder 48 in an axial direction of the cylinder 48, the connecting rod converts the reciprocation movement of the piston 46 into rotation movement of the crankshaft.

The cylinder head 44 is placed on the cylinder block 42, and a gasket 43 intervenes between the cylinder block 42 and the cylinder head 44. The cylinder head 44 partitions a combustion chamber 21 along with the cylinder 48 and the piston 46. The cylinder head 44 is provided with one injector 50 for each cylinder 48. The injector 50 is equiangularly formed with a plurality (four in the present embodiment) of injection holes that radially inject fuel.

The cylinder head 44 is formed with an intake port 25 and an exhaust port 26 for each cylinder 48. The intake port 25 is provided with an intake valve 27 for opening and closing the intake port 25. On the other hand, the exhaust port 26 is provided with an exhaust valve 28 for opening and closing the exhaust port 26.

<Fuel Injection Device>

The fuel injection device 24 is fixed to the internal combustion engine main body 22, and constitutes a fuel injection unit that injects fuel to the combustion chamber 21. The fuel injection device 24 is a common rail type fuel injection device. As shown in FIG. 1, the fuel injection device 24 is provided with the injector 50 for each cylinder 48, an accumulator 52 that stores high pressure fuel to be supplied to each injector 50, and a supply pump 54 that pressurizes fuel in a fuel tank 53 and supplies it to the accumulator 52. The fuel injection device 24 is controlled by the control device 10.

<Plasma Generation Device>

Figure 2:
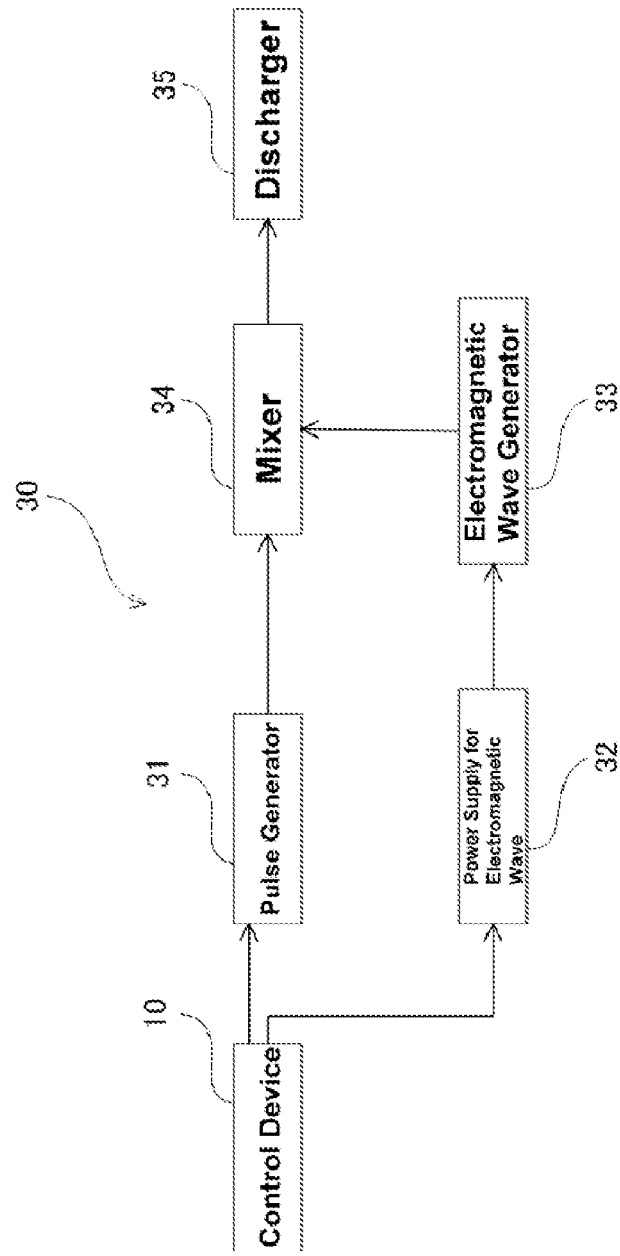
FIG. 2 is a block diagram of a plasma generation device according to the embodiment.

The plasma generation device 30 is attached to the internal combustion engine main body 22, and constitutes a plasma generation unit that generates microwave plasma (electromagnetic wave plasma) by emitting microwaves to the combustion chamber 21. The same number of the plasma generation devices 30 as that of the injection holes of the injector 50 are provided for each cylinder 48. In the present embodiment, there are provided four plasma generation devices 30 for each cylinder 48. Each plasma generation device 30 generates microwave plasma so that the microwave plasma contacts with jet flow injected from each injection hole of the injector 50. Each plasma generation device 30 is controlled by the control device 10. As shown in FIG. 2, each plasma generation device 30 is provided with a pulse generator 31, a power supply for electromagnetic wave 32, an electromagnetic wave generator 33, a mixer 34, and a discharger 35.

The pulse generator 31 is connected to a battery mounted on a vehicle (on which the internal combustion engine 20 is mounted). The pulse generator 31 may be, for example, an ignition coil. The pulse generator 31, upon receiving a discharge signal from the control device 10, boosts a voltage applied from the battery, and outputs the boosted high voltage pulse to the mixer 34.

The power supply for electromagnetic wave 32 is connected to the battery of the vehicle. The power supply for electromagnetic wave 32, upon receiving an electromagnetic wave generation signal from the control device 10, converts an electric current from the battery into a pulse current and outputs it to the electromagnetic wave generator 33. The electromagnetic wave generator 33 may be, for example, a magnetron or a semiconductor oscillator. The electromagnetic wave generator 33, upon receiving the pulse current, outputs a microwave pulse to the mixer 34. The mixer 34 mixes the high voltage pulse and the microwave pulse and outputs them to the discharger 35.

Figure 3:
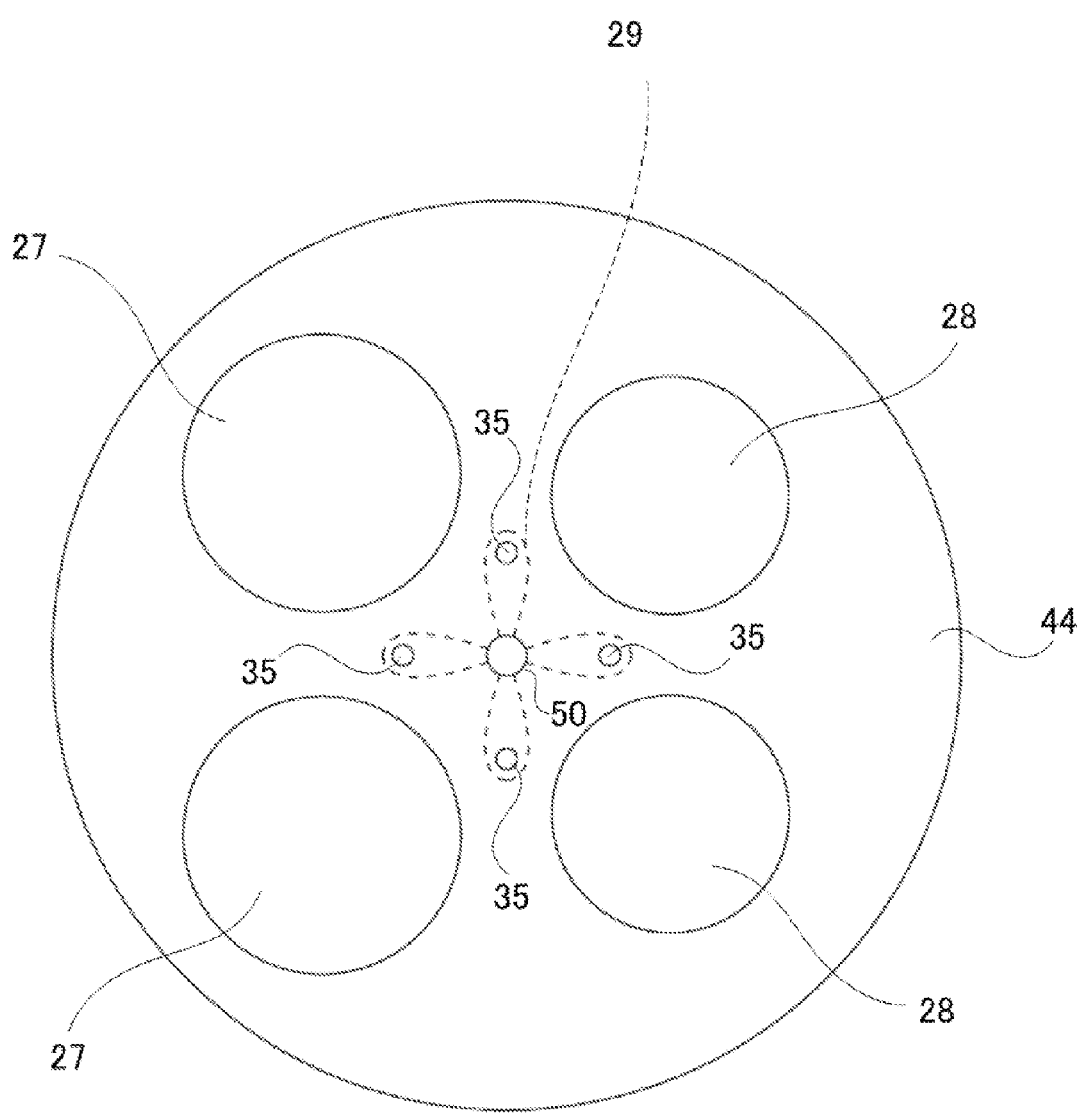
FIG. 3 is a view of a cylinder head of the internal combustion engine according to the embodiment from a side of a combustion chamber.

The discharger 35 may be, for example, a spark plug. The discharger 35 is provided with a discharge electrode electrically connected to the mixer 34, and a ground electrode that forms a discharge gap along with the discharge electrode. In each discharger 35, the discharge gap is located within the combustion chamber 21. As shown in FIG. 3, viewing the cylinder head 44 from the combustion chamber 21 in an axial direction of the cylinder 48, each discharger 35 is located at a position which a jet flow injected from each injection hole of the injector 50 passes through.

The discharger 35, upon receiving the high voltage pulse and the microwave pulse from the mixer 34, causes a spark discharge at the discharge gap, and emits microwaves from the discharge electrode toward discharge plasma generated by the spark discharge. The discharge electrode functions as an antenna for electromagnetic wave. The discharge plasma generated by the spark discharge absorbs the microwave energy and expands. In this manner, the plasma generation device 30 generates non-equilibrium microwave plasma.

The power supply for electromagnetic wave 32, upon receiving the electromagnetic wave generation signal, outputs a pulse current for a predetermined time interval at a predetermined duty cycle. The electromagnetic wave generator 33 outputs the microwave pulse during the time interval. When the predetermined time interval has elapsed after a rise time of the electromagnetic wave generation signal, the microwave pulse generation is terminated, and the microwave plasma disappears.

<Control Device>

Figure 4:
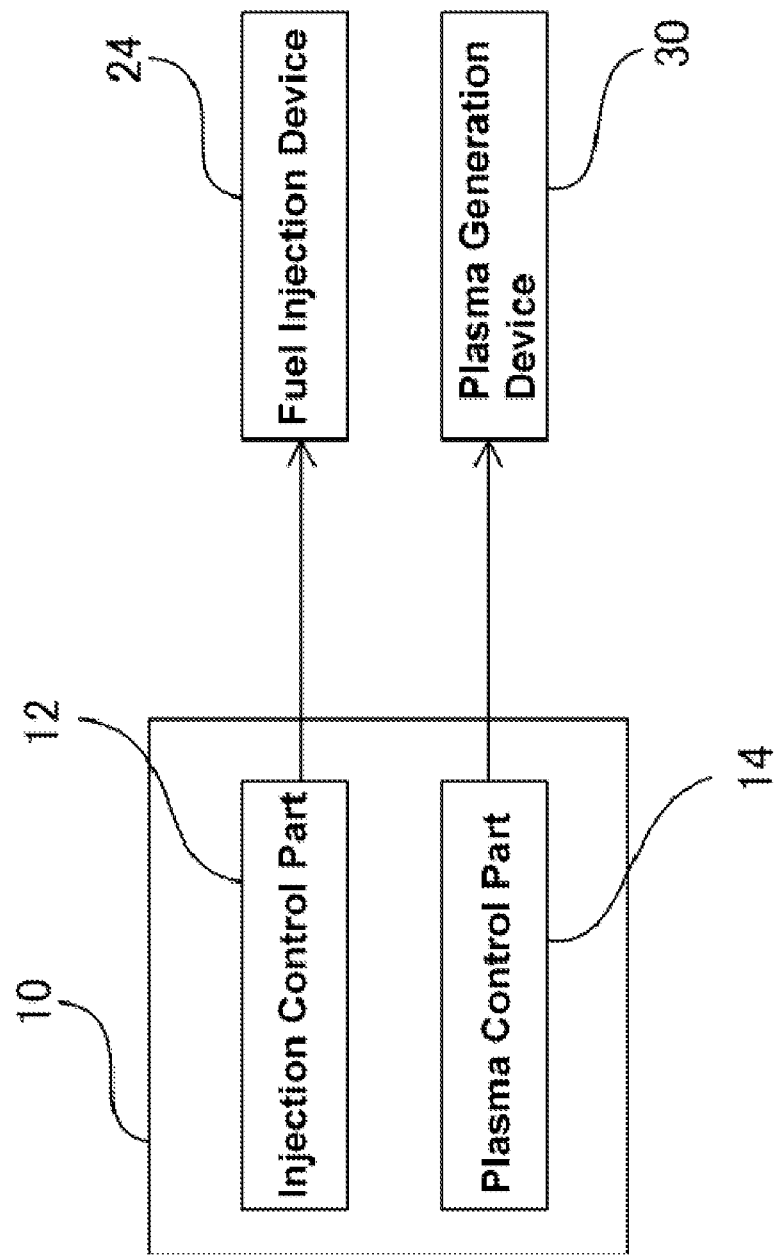
FIG. 4 is a block diagram of a control device according to the embodiment.

The control device 10 constitutes a control unit that controls the fuel injection device 24 and the plasma generation device 30. As shown in FIG. 4, the control device 10 is provided with an injection control part 12 that controls the fuel injection device 24, and a plasma control part 14 that controls the plasma generation device 30.

The injection control part 12 executes a multiple injection control for controlling the fuel injection device 24 to perform a pilot injection, a pre-injection, the main injection, an after injection, and a post-injection for one combustion cycle. As the multiple injection control, the injection control part 12 provides respective injection signals to the injector 50 in response to the multiple injections to control the injector 50 to open and close a valve thereof.

The main injection is executed in order to acquire an engine output, and is largest in injection quantity among the five types of injections. The pilot injection and the pre-injection are executed in order to reduce noise and nitrogen oxide (NOx), and collectively constitute the preceding injection performed prior to the main injection. The pilot injection and the pre-injection are less in injection quantity than the main injection. The after injection is executed in order to reduce particulate matter (PM). The post-injection is executed in order to regenerate an exhaust gas aftertreatment device. Meanwhile, the preceding injection may be constituted by either one of the pilot injection and the pre-injection.

The plasma control part 14 controls each plasma generation device 30 to generate microwave plasma by emitting microwaves to the combustion chamber 21 during the period of the preceding injection. More particularly, the plasma control part 14 controls each plasma generation device 30 to generate microwave plasma during a period of the pilot injection. The plasma control part 14 outputs the discharge signal and the electromagnetic wave generation signal to each plasma generation device 30 at the same timing as the injection signal for the pilot injection.

In each plasma generation device 30, the discharge signal is inputted to the pulse generator 31, and the electromagnetic wave generation signal is inputted to the power supply for electromagnetic wave 32. As a result of this, in the combustion chamber 21, microwave plasma is generated at the discharge gap of each discharger 35 approximately at the same time as the start of the pilot injection. The plasma generation device 30 is controlled so that the microwave plasma is maintained until jet flow of the pilot injection has passed through the discharge gap. This means that the power supply for electromagnetic wave 32 continues to output the pulse current at the predetermined duty cycle until the jet flow of the pilot injection has passed through the discharge gap. Fuel in the jet flow, which is passing through the discharge gap, contacts with the microwave plasma and is forcibly ignited. The amount of fuel injected from the injector 50 and combusted is increased in comparison with a case in which microwave plasma is not generated.

Figure 5:
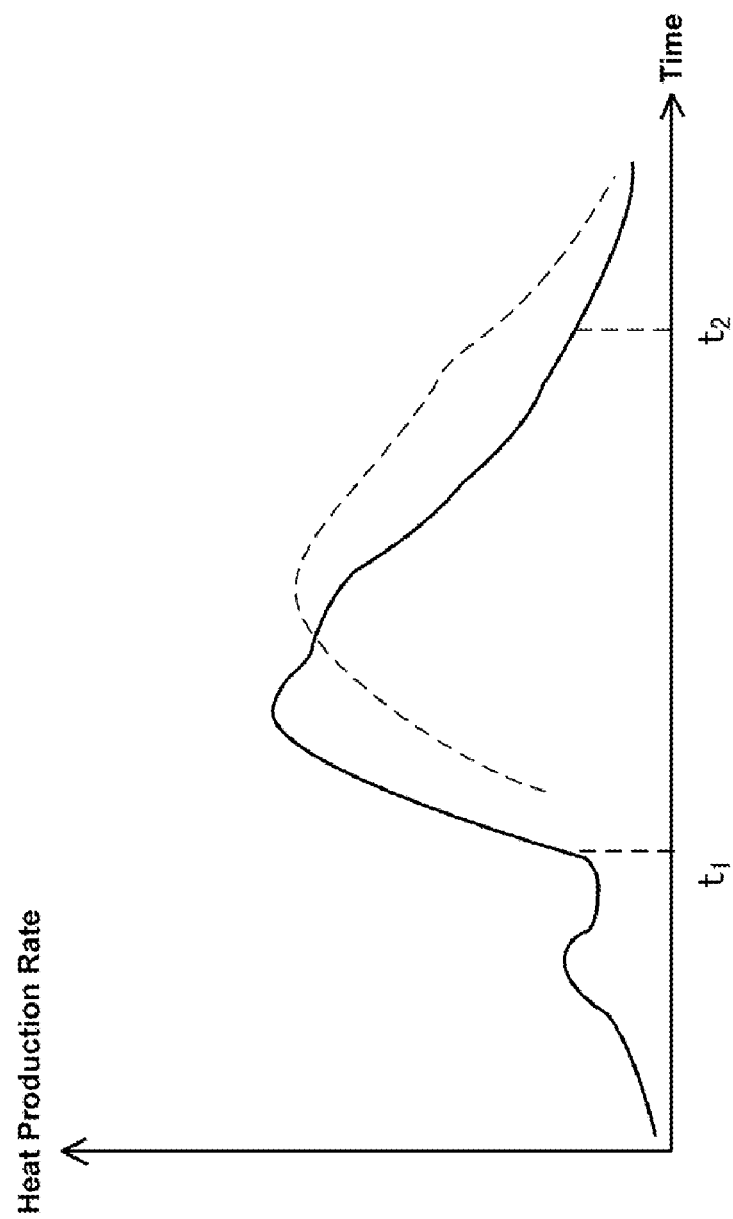
FIG. 5 is a graph illustrating a change in heat production rate of the internal combustion engine according to the embodiment.

In the present embodiment, the plasma control part 14 controls the amount of the energy of the microwave emitted to the combustion chamber 21 during the period of the pilot injection (hereinafter, referred to as "pilot period microwave energy") according to the operating condition of the internal combustion engine main body 22, thereby controlling a rise timing (t1 in FIG. 5) of the heat production due to the main combustion as a condition of the heat production due to the main combustion. Here, the rise timing t1 of the heat production due to the main combustion may be defined as, for example, an inflection point of the line showing variation in heat production rate in FIG. 5. Meanwhile, the rise timing of the heat production due to the main combustion may be defined as a point of time when time differential value of the heat generation rate exceeds a predetermined threshold value.

The plasma control part 14 controls the amount of the energy per unit time of the microwave by changing the duty cycle of the microwave pulse. In a case in which the energy per unit time of the microwave is to be increased, the duty cycle of the microwave pulse is set to a large value. Meanwhile, the plasma control part 14 may control the amount of the energy per unit time of the microwave by changing a peak current value of the microwave. Furthermore, the plasma control part 14 may control the amount of the energy of the microwave during a predetermined period by changing a duration of the microwave pulse. The same is applicable to modified examples, which will be described later.

More particularly, the plasma control part 14 is provided in advance with a control map that determines the amount of the pilot period microwave energy corresponding to the operating condition (such as load and rotation rate) of the internal combustion engine main body 22. The amount of the pilot period microwave energy is determined so that the rise timing of the heat production due to the main combustion should be optimized for each operating condition of the internal combustion engine main body 22.

The plasma control part 14, upon detecting an operating condition of the internal combustion engine main body 22, reads a value (indicative of the amount) of the pilot period microwave energy corresponding to the detected operating condition from the control map. Then, the plasma control part 14 controls the plasma generation device 30 so that the pilot period microwave energy should become equal to the value read from the control map. In a case in which the rise timing of the heat production due to the main combustion is to be advanced (as shown by the solid line in FIG. 5), the plasma control part 14 increases the pilot period microwave energy. On the other hand, in a case in which the rise timing of the heat production due to the main combustion is to be delayed (as shown by the dashed line in FIG. 5), the plasma control part 14 decreases the pilot period microwave energy. This means that, as the rise timing of the heat production due to the main combustion is accelerated, the pilot period microwave energy is increased.

In a case in which the injection quantity of the pilot injection is to be regulated according to the operating condition (such as load and rotation rate) of the internal combustion engine main body 22, the amount of the pilot period microwave energy is determined based on the injection quantity of the pilot injection. For example, the injection quantity of the pilot injection is determined so that the rise timing of the heat production due to the main combustion should be optimized for each operating condition of the internal combustion engine main body 22. The plasma control part 14 increases the pilot period microwave energy as the injection quantity of the pilot injection increases.

Furthermore, in the present embodiment, the microwave plasma is generated for the main injection as well. The plasma control part 14 outputs the electromagnetic wave generation signal to each plasma generation device 30 at the same timing as the injection signal for the main injection. Then, in the combustion chamber 21, each discharger 35 emits a microwave pulse from the discharge electrode thereof approximately at the same time as the start of the main injection. The microwave pulse accelerates electrons in a flame formed by the main injection. As a result of this, microwave plasma is generated in the combustion chamber 21. In the case of the main injection, the microwave plasma is generated by the microwave alone, without causing discharge at the discharge gap. The power supply for electromagnetic wave 32 continues to output the pulse current at a predetermined duty cycle until the jet flows of the main injection has passed through the discharge gaps. In the present embodiment, the main combustion is promoted by causing the jet flow of the main injection to contact with the microwave plasma.

<Effect of Embodiment>

In the present embodiment, the amount of energy of the microwave emitted into the combustion chamber 21 during the pilot injection period is controlled according to the operating condition of the internal combustion engine main body 22. The optimum condition of the main combustion differs depending on the operating condition (such as load and rotation rate) of the internal combustion engine main body 22. In the present embodiment, the amount of energy of the microwave emitted into the combustion chamber 21 during the pilot injection period is determined in view of the operating condition of the internal combustion engine main body 22. Therefore, it is possible to stably optimize the condition of the main combustion in response to a change in operating condition of the internal combustion engine main body 22.

<First Modified Example of Embodiment>

The following description is directed to a first modified example of the present embodiment. In the first modified example, the control device 10 controls the rise timing of the heat production due to the main combustion by controlling not only the pilot period microwave energy but also the timing of the pilot injection in relation to the main injection.

In a case in which the rise timing of the heat production due to the main combustion is to be advanced, a time advance of the pilot injection (a time passed from the start of the pilot injection to the start of the main injection) is increased in relation to the main injection. In a case in which the rise timing of the heat production due to the main combustion is to be delayed, the time advance of the pilot injection is decreased in relation to the main injection.

The first modified example changes mixing degree of the fuel already injected at the point of time of the main injection by changing the time advance of the pilot injection in relation to the main injection, so as to control the rise timing of the heat production due to the main combustion. In the first modified example, since two types of control are employed to control the rise timing of the heat production due to the main combustion, it is possible to expand the control range of the condition of the main combustion.

<Second Modified Example of Embodiment>

The following description is directed to a second modified example of the present embodiment. In the second modified example, the plasma control part 14 controls a length of a period from the rise of the heat production due to the main combustion (t1 in FIG. 5) to the fall of the heat production due to the main combustion (t2 in FIG. 5) (hereinafter, referred to as a "main heat production period"), by controlling the amount of the pilot period microwave energy according to the injection quantity of the pilot injection. Values (indicative of the amounts) of the pilot period microwave energy stored in a control map are determined so that the main heat production period is optimized for the operating condition of the internal combustion engine main body 22. Here, the fall timing t2 of the heat production due to the main combustion may be defined as, for example, an inflection point of the line showing the variation of the heat generation rate in FIG. 5. The fall timing of the heat production due to the main combustion may be defined as a point of time when time differential value of the heat generation rate is below a predetermined threshold value.

The plasma control part 14, upon detecting an operating condition of the internal combustion engine main body 22, reads a value of the pilot period microwave energy corresponding to the detected operating condition from the control map. Then, the plasma control part 14 controls the plasma generation device 30 so that the pilot period microwave energy become equal to the value read from the control map. In a case in which the main heat production period is to be prolonged, the plasma control part 14 increases the pilot period microwave energy. On the other hand, in a case in which the main heat production period is to be shortened, the plasma control part 14 decreases the pilot period microwave energy. This means that, as the main heat production period is prolonged, the pilot period microwave energy is increased.

The injection quantity of the pilot injection is regulated according to the operating condition (such as load and rotation rate) of the internal combustion engine main body 22. For example, the injection quantity of the pilot injection is regulated so that the length of the main heat production period should be optimized for the operating condition of the internal combustion engine main body 22. The amount of the pilot period microwave energy is determined in view of the injection quantity of the pilot injection. The plasma control part 14 increases the pilot period microwave energy as the injection quantity of the pilot injection increases.

<Third Modified Example of Embodiment>

The following description is directed to a third modified example of the present embodiment. In the third modified example, the plasma control part 14 controls the length of the main heat production period by controlling the amount of the energy per unit time of the microwave emitted to the combustion chamber 21 during the period of the main injection (hereinafter, referred to as "main period microwave energy").

In a case in which the rise timing of the heat production due to the main combustion is controlled by the control of the amount of the pilot period microwave energy, it is possible to control both the rise timing of the heat production due to the main combustion and the length of the main heat production period.

<Other Embodiments>

The above described embodiment may also be configured as follows.

In the embodiment described above, the discharge electrode to which the high voltage pulse is applied has been employed as the antenna for electromagnetic wave. However, an antenna for electromagnetic wave may be provided separately from the discharge electrode. In this case, the mixer 34 is not required, the discharger 35 is directly connected to the pulse generator 31, and the antenna for electromagnetic wave is directly connected to the electromagnetic wave generator 33. The antenna for electromagnetic wave may be internally integrated with the discharge 35, and may be provided on the cylinder head 44 separately from the discharger 35.

Furthermore, in the embodiment described above, the plasma control part 14 may control a timing of generating the microwave plasma by the plasma generation device 30 during the period of the preceding injection (the pilot injection and the pre-injection) according to the operating condition of the internal combustion engine main body 22. As a result of this, it is possible to indirectly influence the main combustion and to control as appropriate the condition of the heat production due to the main combustion.

Furthermore, in the embodiment described above, in a case in which it is possible for the jet flow injected from each injection hole to contact with the microwave plasma at a plurality of locations and a timing of generating the microwave plasma is to be controlled, the plasma is not required to be generated simultaneously at the plurality of locations. Rather, it is useful to generate the plasma at the plurality of locations with time differences, since it is possible to prevent a steep rise (exceeding Pmax) of in-cylinder pressure due to rapid combustion throughout the combustion chamber 21.

Furthermore, in the embodiment described above, microwave plasma may be generated for the pre-injection as well. In this case, as the injection quantity of the pre-injection increases, energy is increased of the microwave emitted to the combustion chamber 21 during a period of the pre-injection.

Furthermore, in the embodiment described above, microwave plasma may be generated for the after injection as well, and may be generated for the post-injection as well.

Furthermore, in the embodiment described above, it is useful to decrease the possibility of compression ignition by decreasing compression ratio of the internal combustion engine 20, since it is possible to expand a range of timing control of microwave plasma ignition.

Furthermore, in the embodiment described above, the location of the microwave plasma is not required to be on a central axis line of the jet flow, but may be anywhere as long as atomized fuel can contact with the microwave plasma.

Furthermore, in the embodiment described above, the jet flow injected from each injection hole may contact with the microwave plasma at a plurality of locations. For example, each jet flow may contact with the microwave plasma on a side of the injection hole (e.g., in the vicinity of the injection hole) and on a side of the cylinder wall (e.g., in the vicinity of the cylinder wall). In this case, the microwave plasma may be generated on the side of the injection hole earlier than on the side of the cylinder wall. Since the pressure in the combustion chamber 21 is lower and plasma generation is easier at the point of time of microwave plasma generation on the side of the injection hole than at the point of time of microwave plasma generation on the side of the cylinder wall, it is possible to decrease the energy per unit time of the microwave emitted when the microwave plasma is generated.

Furthermore, in the embodiment described above, since the ease of microwave plasma generation depends on pressure, the energy per unit time of the microwave emitted when the microwave plasma is generated may be changed based on the pressure in the combustion chamber 21. For example, while the pressure in the combustion chamber 21 increases during a period from generation to extinction of the plasma, the energy per unit time of the microwave may be increased.

Furthermore, in the embodiment described above, in a case in which the injector 50 includes a plurality of injection holes different in diameter from one another, when the microwave plasma is generated, the energy per unit time of the microwave emitted to be contacted with the jet flow injected from a large diameter injection hole may be made greater than the energy per unit time of the microwave emitted to be contacted with the jet flow injected from a small diameter injection hole.

Furthermore, in the embodiment described above, the energy per unit time of the microwave emitted when the microwave plasma is generated may be changed according to the type of injection. For example, the energy per unit time of the microwave when the microwave plasma is generated for the pilot injection may be made different from the energy per unit time of the microwave when the microwave plasma is generated for the main injection.

INDUSTRIAL APPLICABILITY

The present invention is useful in relation to a control device for an internal combustion engine that executes compression ignition of fuel in a combustion chamber.

EXPLANATION OF REFERENCE NUMERALS

10 Control Device for Internal Combustion Engine
12 Injection Control Part (Control Unit)
14 Plasma Control Part (Control Unit)
20 Internal Combustion Engine
22 Internal Combustion Engine Main Body
24 Fuel Injection Device (Fuel Injection Unit)
30 Plasma Generation Device (Plasma Generation Unit)

What is claimed is:

1. A control device for an internal combustion engine, the internal combustion engine comprising:
an internal combustion engine main body that has a combustion chamber with a cylinder wall and executes compression ignition of fuel in the combustion chamber;
a fuel injection unit that is attached to the internal combustion engine main body and has an injection hole opened to the combustion chamber to inject fuel thereto; and
a plasma generation unit that is attached to the internal combustion engine main body and generates electromagnetic wave plasma by emitting electromagnetic waves to each vicinity of the injection hole and the cylinder wall in the combustion chamber, and
the control device comprising:
a control unit that controls the fuel injection unit so as to execute, before a main injection, a preceding injection that is less in injection quantity than the main injection, while controlling the plasma generation unit so as to generate electromagnetic wave plasma by emitting electromagnetic waves to the combustion chamber during a period of the preceding injection, wherein
the control unit controls a condition of heat production due to combustion of fuel from the main injection by controlling the plasma generation unit such that the amount of energy of the electromagnetic wave emitted to the vicinity of the injection hole is smaller than the amount of energy of the electromagnetic wave emitted to the vicinity of the cylinder wall during the period of the preceding injection according to an operating condition of the internal combustion engine main body.

2. A control device for an internal combustion engine, the internal combustion engine comprising:
an internal combustion engine main body that executes compression ignition of fuel in a combustion chamber;
a fuel injection unit that is attached to the internal combustion engine main body and injects fuel to the combustion chamber; and
a plasma generation unit that is attached to the internal combustion engine main body and generates electromagnetic wave plasma by emitting electromagnetic waves to the combustion chamber, the control device, and the control device comprising:
a control unit that controls the fuel injection unit so as to execute, before a main injection, a preceding injection that is less in injection quantity than the main injection, while controlling the plasma generation unit so as to generate electromagnetic wave plasma by emitting electromagnetic waves to the combustion chamber during a period of the preceding injection,
wherein the control unit controls a condition of heat production due to combustion of fuel from the main injection by controlling the amount of energy of the electromagnetic wave emitted to the combustion chamber during the period of the preceding injection according to an operating condition of the internal combustion engine main body, and
wherein the control unit controls a rise timing of the heat production due to the combustion of the fuel from the main injection by controlling the amount of the energy of the electromagnetic wave emitted to the combustion chamber during the period of the preceding injection according to injection quantity of the preceding injection.

3. The control device for the internal combustion engine according to claim 2, wherein
the control unit controls the rise timing of the heat production due to the combustion of the fuel from the main injection by controlling a timing of the preceding injection relative to the main injection.

4. A control device for an internal combustion engine, the internal combustion engine comprising:
an internal combustion engine main body that executes compression ignition of fuel in a combustion chamber;
a fuel injection unit that is attached to the internal combustion engine main body and injects fuel to the combustion chamber; and
a plasma generation unit that is attached to the internal combustion engine main body and generates electromagnetic wave plasma by emitting electromagnetic waves to the combustion chamber, the control device, and the control device comprising:

a control unit that controls the fuel injection unit so as to execute, before a main injection, a preceding injection that is less in injection quantity than the main injection, while controlling the plasma generation unit so as to generate electromagnetic wave plasma by emitting electromagnetic waves to the combustion chamber during a period of the preceding injection, wherein the control unit controls a condition of heat production due to combustion of fuel from the main injection by controlling the amount of energy of the electromagnetic wave emitted to the combustion chamber during the period of the preceding injection according to an operating condition of the internal combustion engine main body, and wherein the control unit controls a length of a period from rise to fall of the heat production due to the combustion of the fuel from the main injection by controlling the amount of the energy of the electromagnetic wave emitted to the combustion chamber during the period of the preceding injection according to the injection quantity of the preceding injection.

5. A control device for an internal combustion engine, the internal combustion engine comprising:

an internal combustion engine main body that executes compression ignition of fuel in a combustion chamber;

a fuel injection unit that is attached to the internal combustion engine main body and injects fuel to the combustion chamber; and a plasma generation unit that is attached to the internal combustion engine main body and generates electromagnetic wave plasma by emitting electromagnetic waves to the combustion chamber, the control device, and the control device comprising:

a control unit that controls the fuel injection unit so as to execute, before a main injection, a preceding injection that is less in injection quantity than the main injection, while controlling the plasma generation unit so as to generate electromagnetic wave plasma by emitting electromagnetic waves to the combustion chamber during a period of the preceding injection, wherein the control unit controls a condition of heat production due to combustion of fuel from the main injection by controlling the amount of energy of the electromagnetic wave emitted to the combustion chamber during the period of the preceding injection according to an operating condition of the internal combustion engine main body, and wherein the control unit, while generating electromagnetic wave plasma by emitting electromagnetic waves to the combustion chamber during a period of the main injection, controls the length of the period from rise to fall of the heat production due to the combustion of the fuel from the main injection by controlling the amount of the energy of the electromagnetic wave emitted to the combustion chamber during the period of the main injection.

6. The control device for the internal combustion engine according to claim 1, wherein
the control unit controls a timing for the plasma generation unit to generate the electromagnetic wave plasma during the period of the preceding injection according to the operating condition of the internal combustion engine main body.

7. The control device for the internal combustion engine according to claim 4, wherein
the control unit, while generating electromagnetic wave plasma by emitting electromagnetic waves to the combustion chamber during a period of the main injection, controls the length of the period from rise to fall of the heat production due to the combustion of the fuel from the main injection by controlling the amount of the energy of the electromagnetic wave emitted to the combustion chamber during the period of the main injection.

8. The control device for the internal combustion engine according to claim 2, wherein
the control unit controls a timing for the plasma generation unit to generate the electromagnetic wave plasma during the period of the preceding injection according to the operating condition of the internal combustion engine main body.

9. The control device for the internal combustion engine according to claim 3, wherein
the control unit controls a timing for the plasma generation unit to generate the electromagnetic wave plasma during the period of the preceding injection according to the operating condition of the internal combustion engine main body.

10. The control device for the internal combustion engine according to claim 4, wherein
the control unit controls a timing for the plasma generation unit to generate the electromagnetic wave plasma during the period of the preceding injection according to the operating condition of the internal combustion engine main body.

11. The control device for the internal combustion engine according to claim 5, wherein
the control unit controls a timing for the plasma generation unit to generate the electromagnetic wave plasma during the period of the preceding injection according to the operating condition of the internal combustion engine main body.

* * * * *